US011797292B2

(12) United States Patent
Tokumoto (10) Patent No.: US 11,797,292 B2
(45) Date of Patent: Oct. 24, 2023

(54) INFORMATION PROCESSING APPARATUS USING SWAP FILE, CONTROL METHOD THEREFOR, AND STORAGE MEDIUM

(71) Applicant: CANON KABUSHIKI KAISHA, Tokyo (JP)

(72) Inventor: Yoko Tokumoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 17/503,576

(22) Filed: Oct. 18, 2021

(65) Prior Publication Data

US 2022/0121437 A1 Apr. 21, 2022

(30) Foreign Application Priority Data

Oct. 20, 2020 (JP) .................................. 2020-176265

(51) Int. Cl.
*G06F 9/445* (2018.01)
*G06F 8/65* (2018.01)

(52) U.S. Cl.
CPC ...................................... *G06F 8/65* (2013.01)

(58) Field of Classification Search
CPC ....................................................... G06F 8/65
USPC ................................................. 717/168, 178
See application file for complete search history.

(56) References Cited

U.S. PATENT DOCUMENTS

| 2017/0220404 | A1* | 8/2017 | Polar Seminario ......................... G06F 11/0751 |
| 2018/0046452 | A1* | 2/2018 | Preus .................. G07C 9/00309 |
| 2022/0121437 | A1* | 4/2022 | Tokumoto ................. G06F 8/65 |
| 2023/0132494 | A1* | 5/2023 | Yagi ........................ G06F 8/654 717/170 |

FOREIGN PATENT DOCUMENTS

JP 6524928 B2 6/2019

* cited by examiner

*Primary Examiner* — Chuck O Kendall
(74) *Attorney, Agent, or Firm* — ROSSI, KIMMS & McDOWELL LLP (57) ABSTRACT

An information processing apparatus which is capable of improving performance without increasing memory or storage capacity. The information processing apparatus includes a storage device that includes a first area in which first firmware is stored, a second area in which second firmware is stored, and a common area that is used in a case where the information processing apparatus is started using the first or second firmware. The information processing apparatus is started in a first startup using the first firmware or started in a second startup using the second firmware. During the first startup, a swap file is created in the common area, and swapping is activated. During the second startup, in a case where a swap file is present in the common area, the swap file is deleted from the common area.

6 Claims, 8 Drawing Sheets

| 400 | PARTITIONS | NORMAL STARTUP | STARTUP FOR UPDATE |
|---|---|---|---|
| 301 | STANDARD FIRMWARE STORAGE AREA | READ ONLY (RO) | READ-WRITE (RW) |
| 302 | SAFE FIRMWARE STORAGE AREA | — | READ ONLY (RO) |
| 303a | USER DATA STORAGE AREA | READ-WRITE (RW) | — |
| 303b | USER DATA STORAGE AREA | READ-WRITE (RW) | — |
| 304a | WORK AREA | READ-WRITE (RW) | — |
| 304b | WORK AREA | READ-WRITE (RW) | — |
| 305 | SHARED WORK AREA | READ-WRITE (RW) | READ-WRITE (RW) |

INFORMATION PROCESSING APPARATUS USING SWAP FILE, CONTROL METHOD THEREFOR, AND STORAGE MEDIUM

BACKGROUND OF THE INVENTION

Field of the Invention

The present invention relates to information processing apparatuses, control methods therefor, and storage media, and in particular to information processing apparatuses that control creation and switching of swap files in the information processing apparatuses such as digital multi-function peripherals, control methods therefor, and storage media.

Description of the Related Art

In recent years, there have been demands for compact digital multi-function peripherals capable of closely coordinating with digital multi-function peripherals for office use. To commercialize such compact digital multi-function peripherals, it is necessary to decrease their hardware cost by reducing memory or storage capacity while achieving coordination with various functions of digital multi-function peripherals for office use. On the other hand, if an attempt is made to use such small-capacity memory or storage device to operate high-performance software capable of coordinating with functions of digital multi-function peripherals for office use, a problem will arise because sufficient memory space cannot be allocated for the software.

Japanese Patent Publication No. 6524928 discloses an example of a prior art that improves performance of image forming apparatuses such as digital multi-function peripherals without increasing memory capacity.

In the disclosed image forming apparatus, while an image processor does not use a memory area for image processing, a swap file for an OS is created by using a part of this memory area for image processing, and the created swap file for the OS is backed up in a storage device. After that, when the memory area for image processing is to be used by the image processing device, the swap file for the OS that is referred to is switched to the backed-up swap file for the OS.

However, in the disclosed image forming apparatus, the swap file for the OS is created by using a part of the memory area for image processing, and it is impossible to create a swap file for the OS larger than the size of the memory area for image processing. For example, when the size of the memory area for image processing is 1 GB, a 2 GB swap file for the OS cannot be created. In this case, if memory is added so that the size of the memory area for image processing can be larger than 2 GB, creation of the swap file for the OS will become possible, but it increases the cost.

Moreover, memory (DRAM) is more expensive than semiconductor storage devices (SSD, eMMC, etc.) and HDDs used as a storage device, which is also a problem.

Furthermore, in the disclosed image forming apparatus, the swap file for the OS, which is constantly backed up in a storage device, needs large storage capacity, which brings about cost increase.

SUMMARY OF THE INVENTION

The present invention provides information processing apparatuses, control methods therefor and storage media, which are capable of improving performance without increasing memory or storage capacity.

According to an aspect of the embodiments, an information processing apparatus includes a storage device and at least one processor. The storage device includes a first area in which first firmware is stored, a second area in which second firmware is stored, and a common area that is used in a case where the information processing apparatus is started using the first firmware or the second firmware. The at least one processor executes instructions stored in the storage device to perform a first startup in which the information processing apparatus is started using the first firmware, or a second startup in which the information processing apparatus is started by using the second firmware. The at least one processor further executes instructions stored in the storage device to, during the first startup, create a swap file in the common area and activate swapping, and during the second startup, in a case where a swap file is present in the common area, delete the swap file from the common area.

According to the present invention, performance of the information processing apparatus is improved without increasing memory or storage capacity.

Further features of the present invention will become apparent from the following description of exemplary embodiments with reference to the attached drawings.

DESCRIPTION OF THE EMBODIMENTS

The present invention will now be described in detail below with reference to the accompanying drawings showing an embodiment thereof. It should be noted that in the following description, a digital multi-function peripheral (MFP) is taken as an example of an information processing apparatus according to the embodiment of the present invention. The present invention, however, is not limited to digital multi-function peripherals, but those to which the present invention is applied have only to be information processing apparatuses.

Hardware Arrangement

Figure 1:
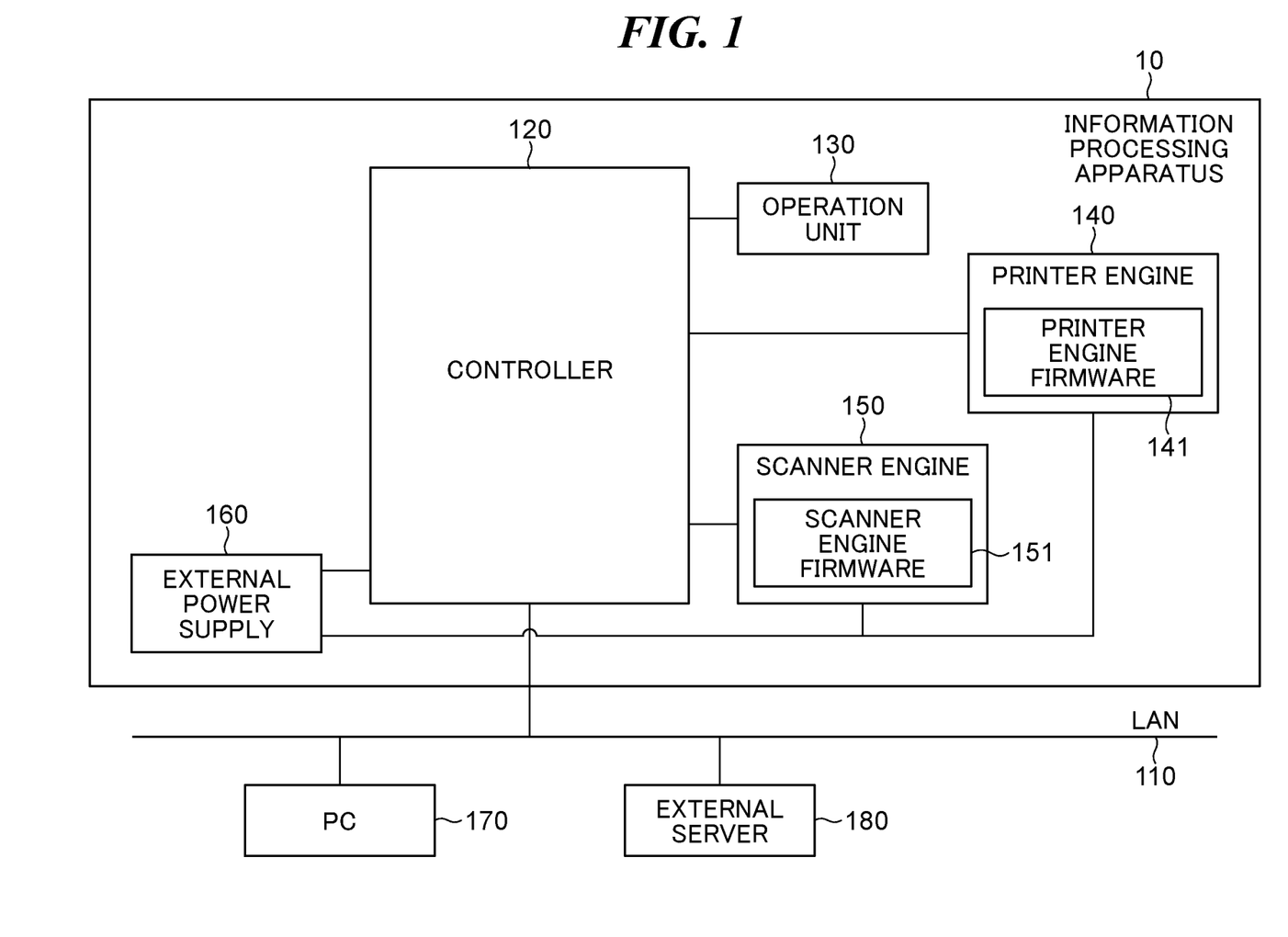
FIG. 1 is a block diagram illustrating an example of a hardware arrangement of an information processing apparatus according to an embodiment of the present invention.
Figure 2:
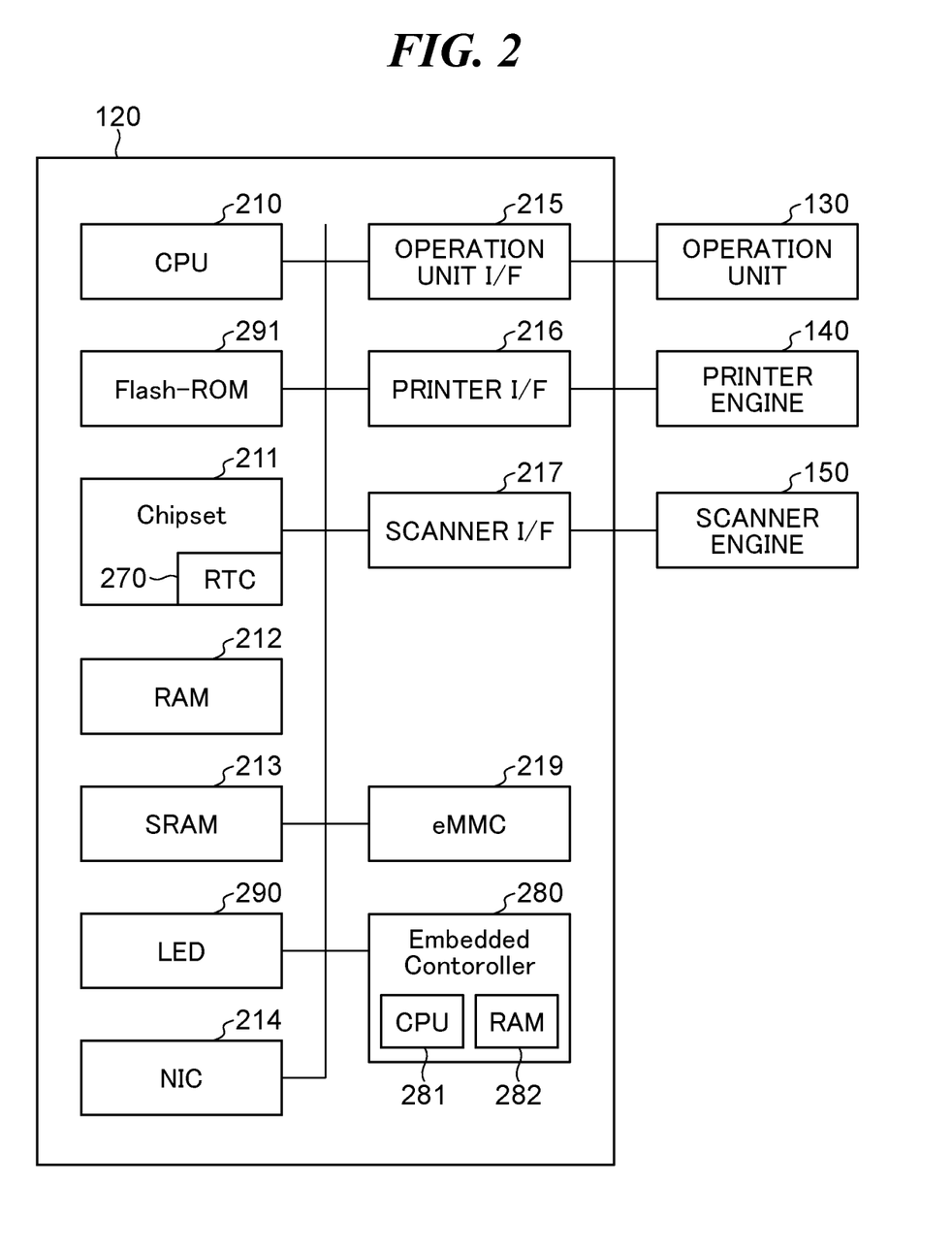
FIG. 2 is a block diagram illustrating an example of a hardware arrangement of a controller of the information processing apparatus.

FIG. 1 is a block diagram illustrating an example of a hardware arrangement of the information processing apparatus 10 according to the embodiment of the present invention. FIG. 2 is a block diagram illustrating an example of a hardware arrangement of a controller 120 of the information processing apparatus 10.

The information processing apparatus 10 is connected to an external PC 170 and an external server 180 via a LAN 110. The information processing apparatus 10 includes the controller 120, an operation unit 130, a printer engine 140, a scanner engine 150, and an external power supply 160.

The controller 120 includes a CPU 210, a chipset 211, a RAM 212, an SRAM 213, a network I/F card (NIC) 214, an operation unit I/F 215, and a printer I/F 216. The controller 120 further includes a scanner I/F 217, a semiconductor storage device (eMMC) 219, an embedded controller 280, an LED 290, and a flash ROM 291.

The controller 120 including the CPU 210 controls the overall operation of the information processing apparatus 10.

The CPU 210 reads control programs stored in the eMMC 219 to carry out various types of control processes such as reading control, printing control, and firmware update control.

The eMMC 219 is used as a work area and a user data area.

The flash ROM 291, which is a read-only memory, stores various data including BIOS and fixed parameters for the information processing apparatus 10.

The RAM 212 is used as a temporary storage area such as a main memory and a work area for the CPU 210.

The SRAM 213 is a nonvolatile memory, in which data is not lost even when the power is turned off, and stores setting values, image adjustment values, and so forth required for the information processing apparatus 10.

The operation unit I/F 215 connects the operation unit 130 and the controller 120 together.

The operation unit 130 is comprised of user interfaces such as a liquid display unit having a touch screen function and a keyboard.

The printer I/F 216 connects the printer engine 140 and the controller 120 together.

The printer engine 140 includes printer engine firmware 141 stored in an unillustrated ROM located in the printer engine 140. Image data to be printed by the printer engine 140 is transferred from the controller 120 to the printer engine 140 via the printer I/F 216 and printed on a recording medium by the printer engine 140.

The scanner I/F 217 connects the scanner engine 150 and the controller 120 together.

The scanner engine 150 includes scanner engine firmware 151 stored in an unillustrated ROM located in the scanner engine 150. The scanner engine 150 reads an image on an original to create image data and inputs the image data to the controller 120 via the scanner I/F 217.

The NIC 214 connects the controller 120 (the information processing apparatus 10) to the LAN 110. The NIC 214 sends image data and information to and receives update firmware and various types of information from external apparatuses (for example, the external server 180 and the PC 170) on the LAN 110. It should be noted that although the external server 180 is located on the LAN 110 in the present embodiment, this is not limitative as long as the external server 180 is configured to be directly or indirectly connected to the information processing apparatus 10. For example, the external server 180 may be located on the Internet connected to the LAN 110. Moreover, in the present embodiment, a user operates the information processing apparatus 10 through the operation unit 130, but may operate the information processing apparatus 10 through a Web browser, which is not illustrated, on the PC 170.

The chipset 211 is a group of integrated circuits related to one another.

An RTC 270, which is a real-time clock, is a chip for measuring the passage of time.

The external power supply 160 shuts off power supply to the controller 120 when the information processing apparatus 10 goes into sleep mode according to an instruction from a control program in the eMMC 219, and during sleep, the chipset 211 and the RTC 270 are supplied with power from a built-in battery, which is not illustrated, in the controller 120. For this reason, the chipset 211 and the RTC 270 are able to operate even during sleep, and this enables the information processing apparatus 10 to wake up from sleep. On the other hand, while the power is off, no power is supplied to the chipset 211 and the RTC 270, and hence the chipset 211 and the RTC 270 are not able to operate.

A CPU 281 executes software programs for the embedded controller 280 and performs some control in the information processing apparatus 10.

A RAM 282, which is a random access memory, is used to store programs and temporary data when the CPU 281 controls the information processing apparatus 10.

The LED 290 lights up as necessary and is used to externally notify about abnormalities of software and hardware.

Partition Arrangement

Figure 3:
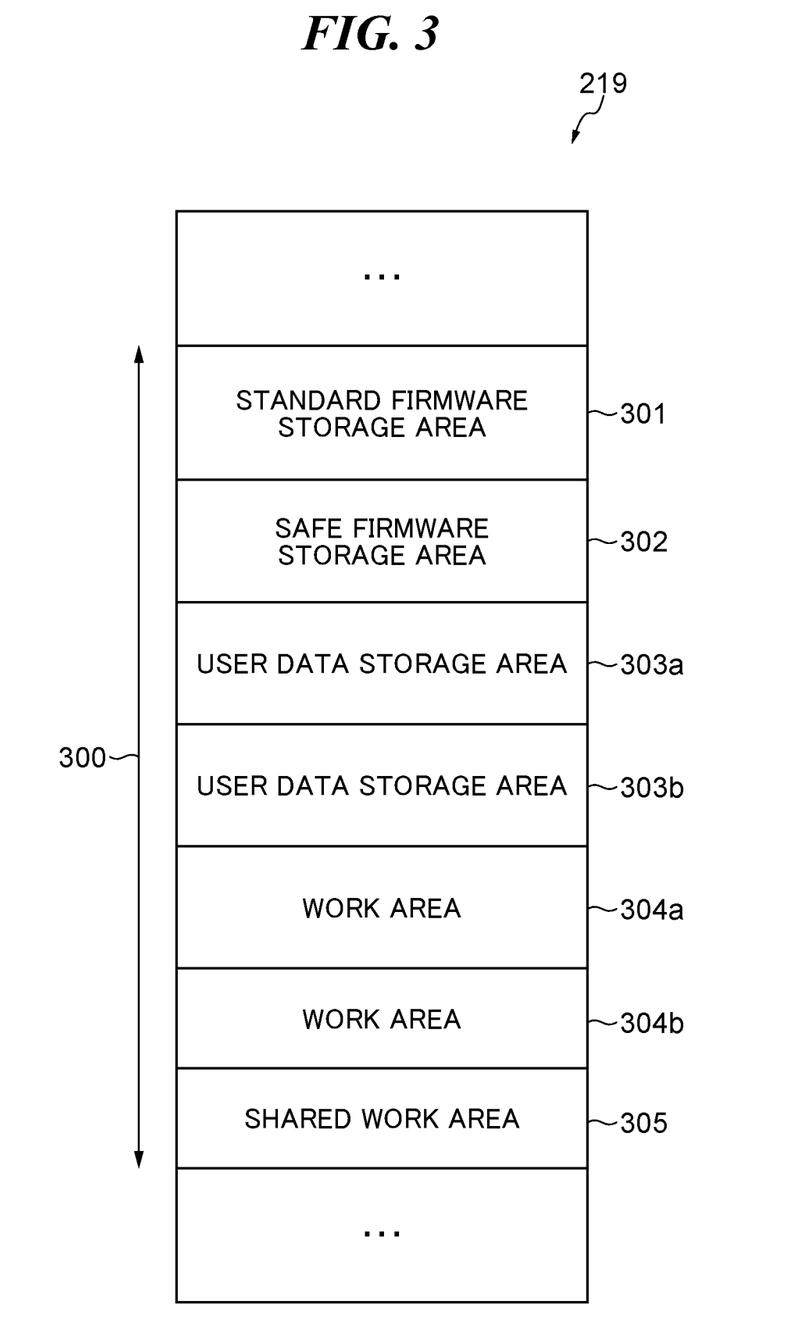
FIG. 3 is a view illustrating an example of a partition arrangement of a system area in an eMMC included in the controller.

FIG. 3 is a view illustrating an example of a partition arrangement of a system area 300 in the eMMC 219 included in the controller 120.

As illustrated in FIG. 3, the system area 300 has the following seven partitions: a standard firmware storage area 301, a safe firmware storage area 302, user data storage areas 303a and 303b, work areas 304a and 304b, and a shared work area 305.

The standard firmware storage area 301 is a partition in which normal startup firmware is stored.

The safe firmware storage area 302 is a partition in which update firmware for updating the normal startup firmware is stored. In the following description, the update firmware will be referred to as the safe firmware, and the normal startup firmware will be referred to as the standard firmware for the sake of simplification.

The user data storage areas 303a and 303b are partitions in which various types of user data are stored, and the work areas 304a and 304b are partitions that are used as work areas for use in, for example, executing jobs.

The shared work area 305 (common area) is a partition that is used as a work area in a shared manner at normal startup and at startup for update.

Mount Configuration

Figure 4:
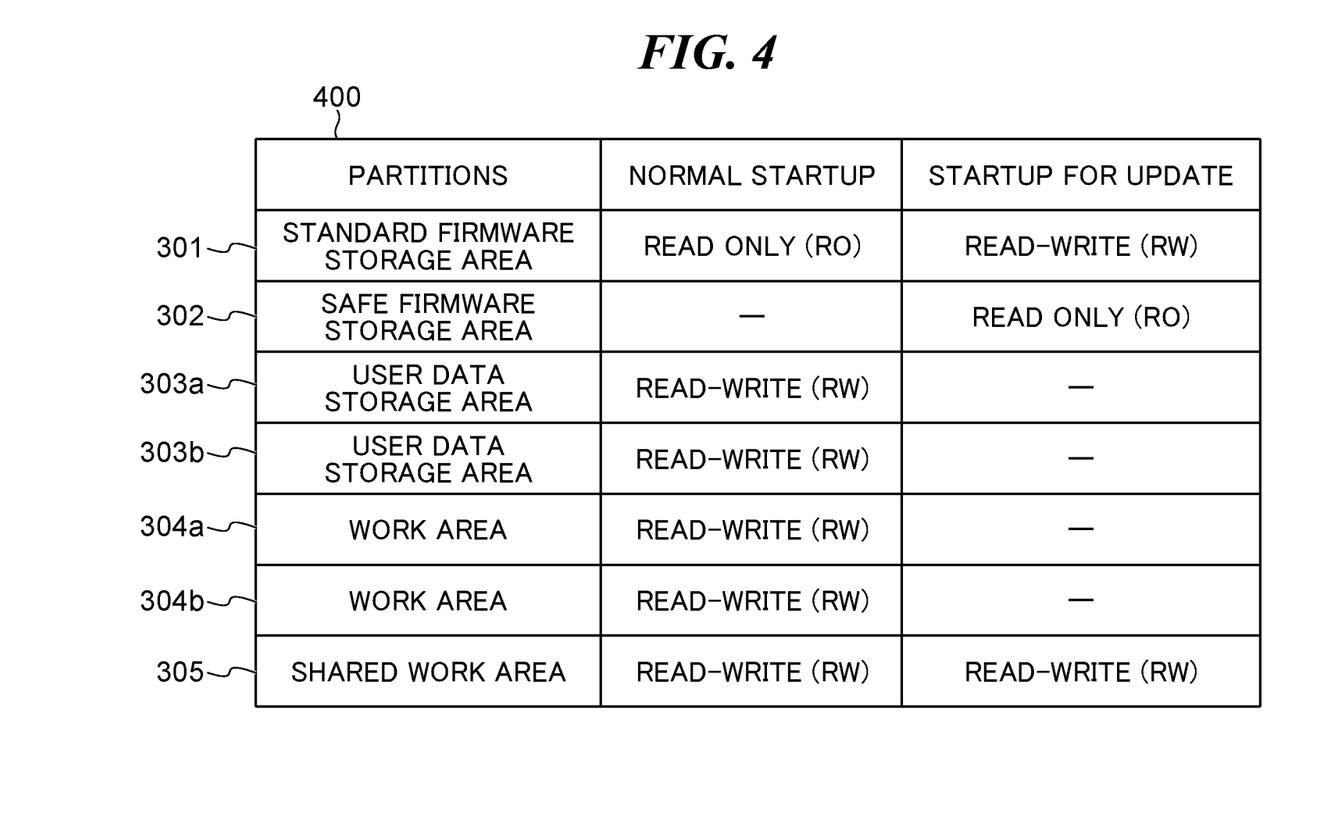
FIG. 4 is a view illustrating a mount configuration table illustrating an example of how partitions in the system area in the eMMC are mounted.

FIG. 4 is a view illustrating a mount configuration table 400 showing an example of how to mount the partitions in the system area 300 in the eMMC 219. The eMMC 219 operates in a state in which the partitions in the system area 300 in FIG. 3 have been mounted according to startup modes. Here, the startup modes refer to a mode of normal startup (first startup) in which the information processing apparatus 10 is normally started using the standard firmware, and a mode of startup for update (second startup) in which the information processing apparatus 10 is started for update using the safe firmware. The information processing apparatus 10 has a function of switching the startup modes, and a loader 505 starts the standard firmware or the safe firmware according to startup mode information stored in the SRAM 213. The information processing apparatus 10 performs firmware update, which will be described later, while switching the startup modes.

The standard firmware storage area 301 is a partition that is mounted with a read-only permission (RO) and used during normal startup from a security standpoint. During startup for firmware update, the standard firmware storage area 301 is mounted with read-write permissions (RW) and used so as to update firmware.

Likewise, the safe firmware storage area 302 is a partition that is mounted with a read-only permission (RO) and used during startup for firmware update from a security standpoint. During normal startup, the safe firmware storage area 302 is not mounted if it is unnecessary to update the safe firmware.

The user data storage areas 303a and 303b and the work areas 304a and 304b are partitions that are mounted with read-write permissions (RW) and used during normal startup. During startup for update, the user data storage areas 303a and 303b and the work areas 304a and 304b are not in use basically, and hence they are not mounted.

The shared work area 305 is a partition that is mounted with read-write permissions (RW) and used so as to store a swap file and new firmware for update, which is downloaded in the background, during normal startup. During startup for update, the shared work area 305 is also mounted with read-write permissions (RW) and used because it acts as a work area for firmware update and stores a backup of older version of firmware.

Arrangement of Firmware Modules

Figure 5:
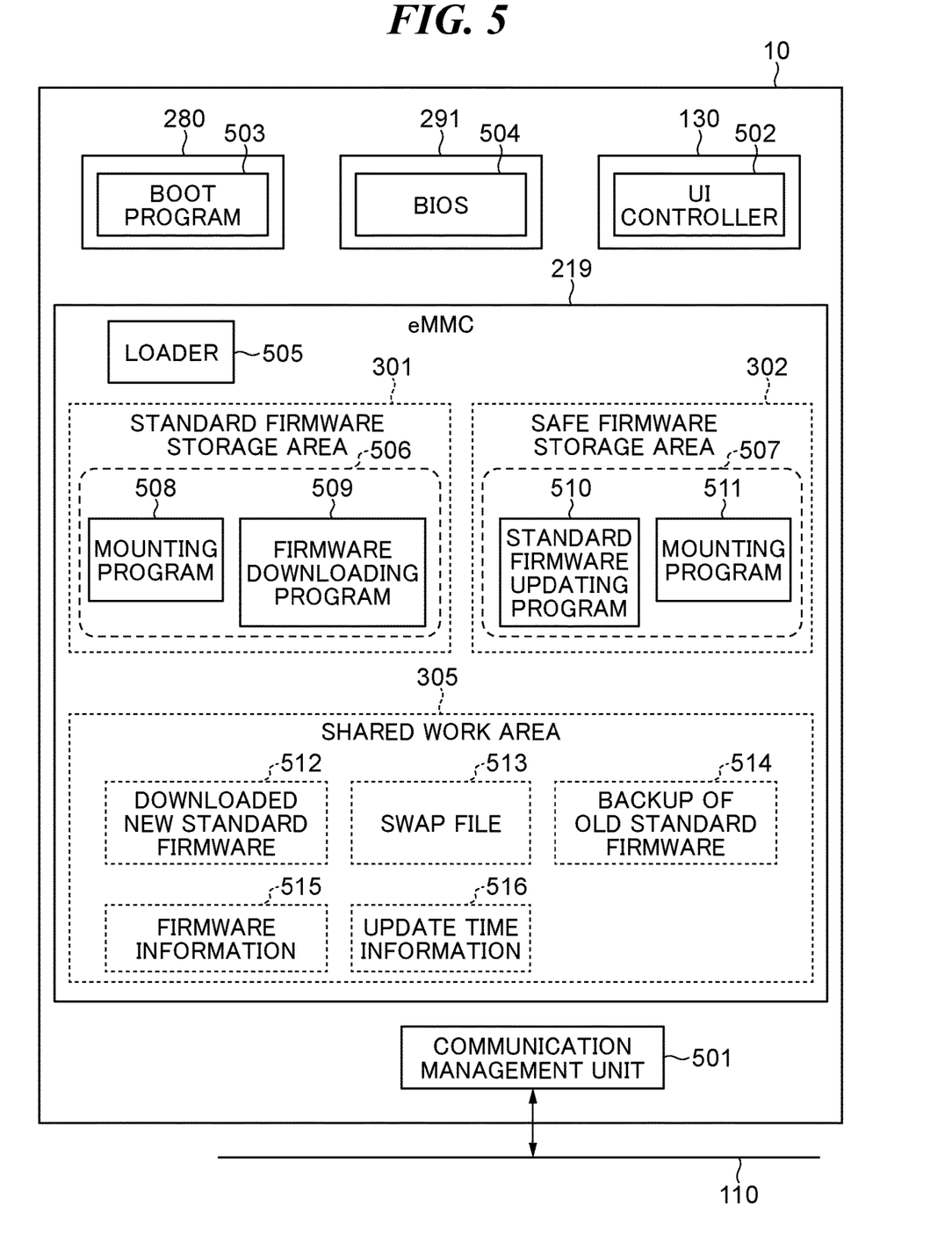
FIG. 5 is a block diagram illustrating an example of an arrangement of firmware modules which the information processing apparatus has.

FIG. 5 is a block diagram illustrating an example of an arrangement of firmware modules which the information processing apparatus 10 has.

A communication management unit 501 controls the NIC 214, which is connected to the LAN 110, to send and receive data to and from external apparatuses via the LAN 110.

A UI controller 502 receives inputs to the operation unit 130 via the operation unit I/F 215 and performs processing and displays outputs according to the inputs.

A boot program 503 is a program that is executed by the CPU 281 of the embedded controller 280 when the power to the information processing apparatus 10 is turned on, and performs processing related to startup.

BIOS 504 is a program that is executed by the CPU 210 after execution of the boot program 503 and performs processing related to startup.

The loader 505 is a program that is executed by the CPU 210 after completion of the processing by the BIOS 504 and performs processing related to startup. The loader 505 starts the standard firmware or the safe firmware according to startup mode information stored in the SRAM 213.

The standard firmware storage area 301 and the safe firmware storage area 302 are partitions configured inside the eMMC 219 described earlier with reference to FIG. 3. The standard firmware storage area 301 (first area) includes standard firmware 506 that is firmware for normal startup. The safe firmware storage area 302 (second area) includes safe firmware 507 that is startup firmware for update.

The standard firmware 506 (first firmware) is a program that is executed by the CPU 210 and comprised of a plurality of programs that implement functions of the information processing apparatus 10. Examples of them include programs controlling the scanner I/F 217 and the printer I/F 216, a startup program, and so forth. The standard firmware 506 includes a mounting program 508. At normal startup, the startup program is called from the standard firmware 506 to carry out a startup process in which, for example, areas to be used for normal startup in the eMMC 219 are mounted by the mounting program 508. After that, programs implementing functions of the information processing apparatus 10 are started. The standard firmware 506 also includes firmware downloading program 509 that downloads firmware.

The safe firmware 507 (second firmware) is a program that is executed by the CPU 210 at startup for update. The safe firmware 507 is comprised of a plurality of programs such as a standard firmware updating program 510, which updates the standard firmware for the information processing apparatus 10, and a mounting program 511.

The standard firmware updating program 510 has a function of updating the standard firmware 506, printer engine firmware 141 (FIG. 1), and scanner engine firmware 151 (FIG. 1). Also, when an arrangement like an unillustrated finisher other than a scanner engine and a printer engine is connected to the information processing apparatus 10 (or the controller 120), the standard firmware updating program 510 updates firmware for this arrangement. The mounting program 511 carries out a mounting process at startup for update.

The shared work area 305 is a partition for a shared work configured inside the eMMC 219 described earlier with reference to FIG. 3 as well. In the shared work area 305, standard firmware 512 for update, which was downloaded during normal startup, is temporarily stored, a swap file 513 is stored during normal startup, and a backup 514 of an older version of standard firmware is stored during startup for update.

Creation and Activation of Swap File at Normal Startup

Figure 6:
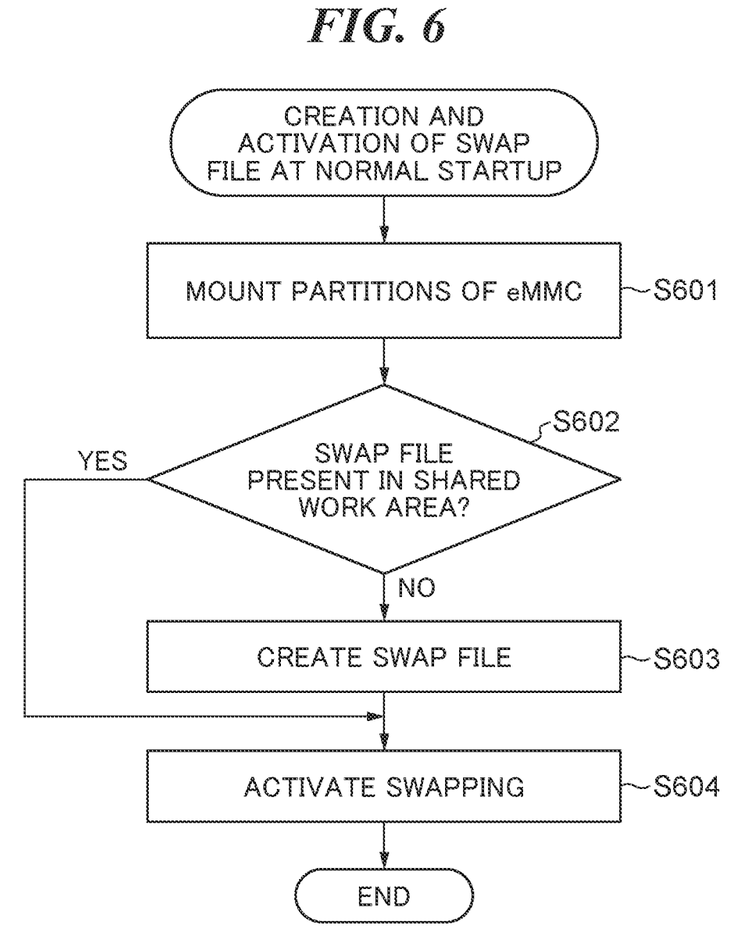
FIG. 6 is a flowchart of a process of creation and activation of a swap file at normal startup of the information processing apparatus.

Referring to a flowchart in FIG. 6, a description will now be given of a process in which a swap file is created and activated during normal startup of the information processing apparatus 10. Steps of the flowchart in FIG. 6 are executed by the CPU 210 according to programs stored in the eMMC 219 in FIG. 2. This process is carried out during normal startup of the information processing apparatus 10 using the standard firmware 506 stored in the standard firmware storage area 301 in response to turning-on of the power, a restart instruction, or the like.

First, in step S601, according to a mounting program 508, the CPU 210 carries out a mounting process for partitions of the system area 300 in the eMMC 219 based on the mount configuration table 400 in FIG. 4.

Next, in step S602, according to the mounting program 508, the CPU 210 checks whether or not a swap file 513 is present in the shared work area 305 mounted in the step S601. When a swap file 513 is present in the shared work area 305 (YES in the step S602), the process proceeds to step S604, in which the CPU 210 in turn activates swapping (or activates the swap file 513) using the swap file 513 that has been present and ends the present process. On the other hand, when a swap file 513 is not present (NO in the step S602), the process proceeds to step S603.

In the step S603, according to the mounting program 508, the CPU 210 creates a swap file 513 in the shared work area 305, and then the process proceeds to step S604.

In the step S604, the CPU 210 activates swapping (or activates the swap file 513) using the swap file 513 created in the shared work area 305 and ends the present process.

Deletion of Swap File at Firmware Update

Figure 7A:
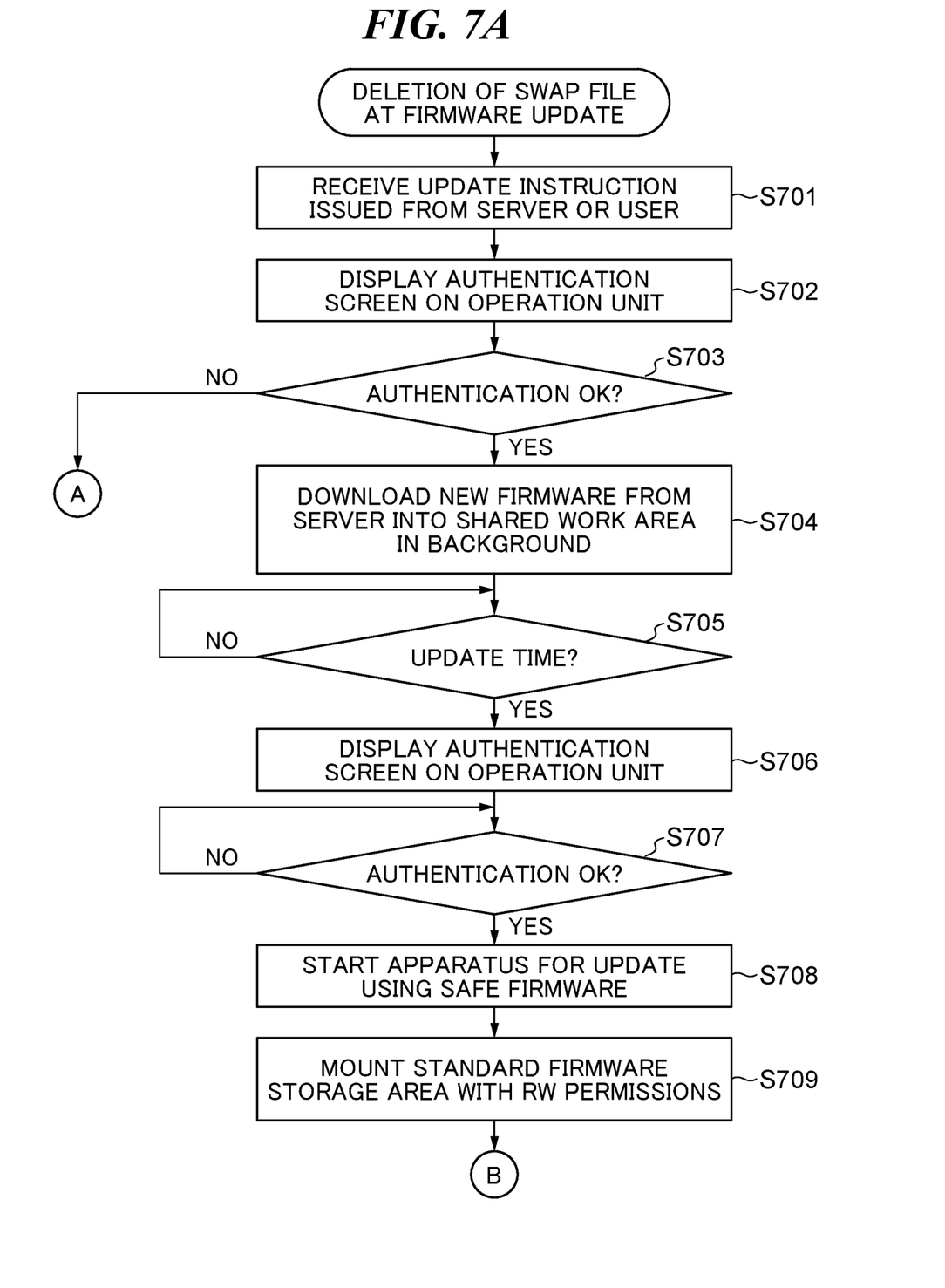
FIGS. 7A and 7B are flowcharts of a process of deletion of the swap file at firmware update.
Figure 7B:
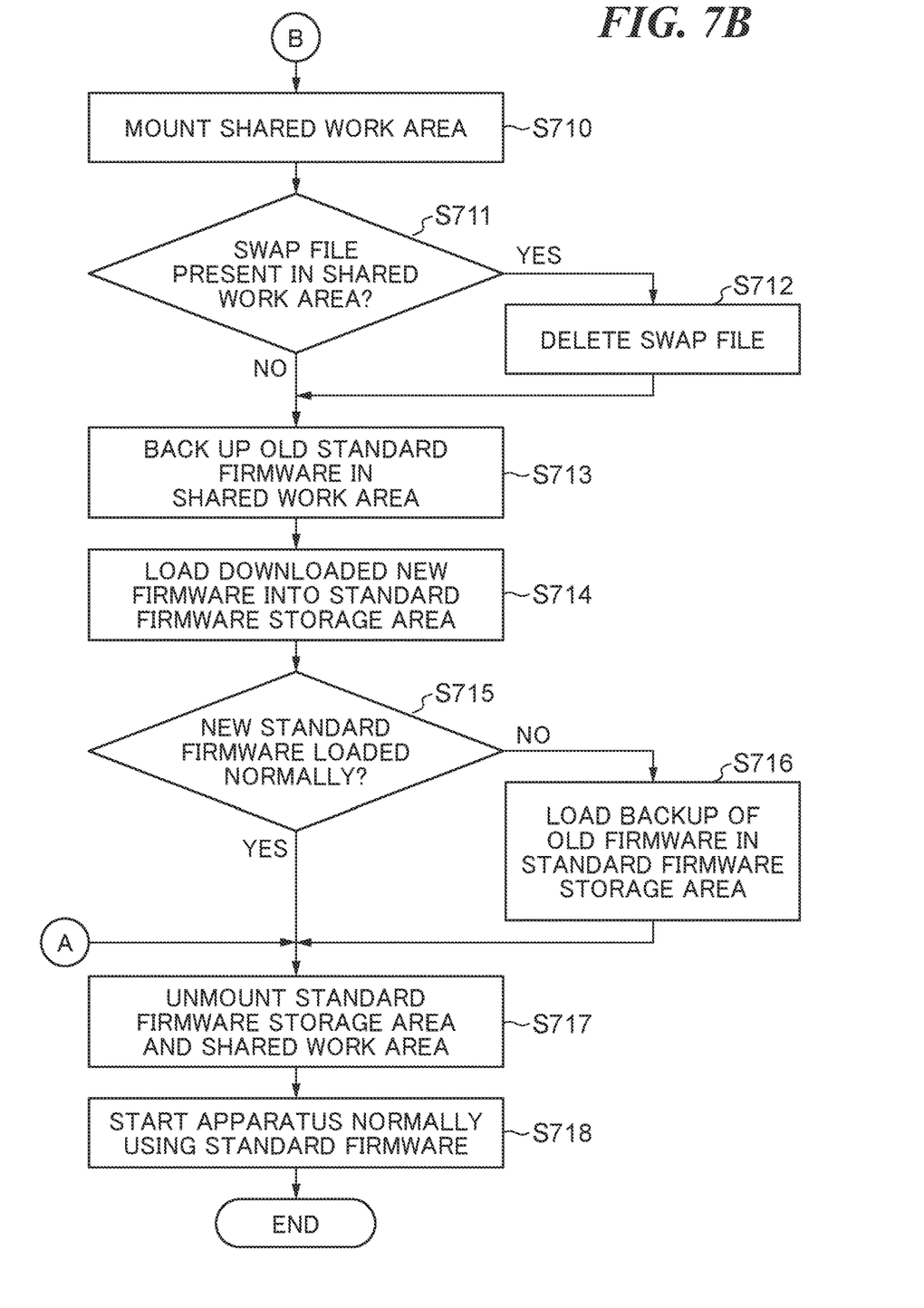

Referring to flowcharts of FIGS. 7A and 7B, a description will now be given of a process in which a swap file is deleted when firmware is updated. During a time period over which firmware is updated as illustrated in FIGS. 7A and 7B, namely, during a time period from receipt of a restart instruction for starting a process of startup of the information processing apparatus 10 for update to the start of a process of normal startup of the information processing apparatus 10 after the end of firmware update, the information processing apparatus 10 accepts no user operations. During this time period, the information processing apparatus 10 does not receive any jobs such as a print job, a scan job, and a fax job. Steps of the flowcharts of FIGS. 7A and 7B are executed by the CPU 210 according to a program stored in the eMMC 219 in FIG. 2.

In step S701, when the information processing apparatus 10 is in a normal startup state in which the standard firmware 506 in the standard firmware storage area 301 has been started, and receives a firmware updating instruction from the external server 108 or the operation unit 130, the process proceeds to step S702. At this time, the CPU 210 reads the firmware downloading program 509 included in the standard firmware 506 in the eMMC 219 and starts a firmware updating process. Upon starting the updating process, the CPU 210 obtains firmware information about new firmware for update, and stores this as firmware information 515 in the shared work area 305.

Next, in step S702, the CPU 210 displays an authentication screen on the operation unit 130.

In step S703, upon authenticating a user through the authentication screen displayed in the step S702, the process proceeds to step S704. On the other hand, when a user is not authenticated in the step S703, the process proceeds to step S717.

In the step S704, the CPU 210 downloads new standard firmware from the external server 180 in the background and stores it as downloaded standard firmware 512 for update in the shared work area 305. The downloaded standard firmware 512 for update is a new version of the program stored in the standard firmware storage area 301. It should be noted that the steps S702 and 703 can be skipped for firmware that does not require user authentication.

Then, in step S705, when a firmware update time is not set in update time information 516 in the shared work area 305, or when this setting has already been made and the set firmware update time has arrived, the process proceeds to step S706. The firmware update time may be set in advance as a regular execution time, set from the external server 180 when an update of firmware has been received, or set from the operation unit 130 by the user.

In the step S706, the CPU 210 displays an authentication screen on the operation unit 130.

In step S707, upon authenticating a user has through the authentication screen displayed in the step S706, the process proceeds to step S708, in which the safe firmware 507 in turn starts the information processing apparatus 10 for update. It should be noted that as with the steps S702 and S703, the steps S706 and 707 can be skipped for firmware that does not require user authentication.

In step S709, according to the mounting program 511, when update startup using the safe firmware 507 is started, the CPU 210 mounts the standard firmware storage area 301 with read-write permissions (RW) based on the mount configuration table 400 in FIG. 4.

Next, in step S710, the CPU 210 mounts the shared work area 305 with read-write permissions (RW).

In step S711, according to the mounting program 511, the CPU 210 checks whether or not a swap file 513 is present in the mounted shared work area 305. When a swap file 513 is present in the shared work area 305 (YES in the step S711), the process proceeds to step S712, in which the CPU 210 in turn deletes the swap file 513 from the shared work area 305. After the swap file 513 becomes absent in the shared work area 305, the CPU 210 ends execution of the mounting program 511, followed by the process proceeding to step S713. On the other hand, when a swap file 513 is not present in the shared work area 305 (NO in the step S711), the CPU 210 ends execution of the mounting program 511 without doing anything, and the process proceeds directly to step S713.

In the step S713, according to the standard firmware updating program 510, the CPU 210 stores data necessary for updating the standard firmware 506 in the shared work area 305. For example, the CPU 210 stores a copy of earlier standard firmware that is now present in the standard firmware storage area 301 in the shared work area 305 as a backup 514 of the older version of the standard firmware.

In step S714, according to the standard firmware updating program 510, the CPU 210 loads the standard firmware 512 for update in the shared work area 305, which was downloaded during normal startup, into the standard firmware storage area 301. As a result, the standard firmware 506 stored in the standard firmware storage area 301 is updated.

In step S715, the CPU 210 checks whether or not the normally-downloaded standard firmware 512 for update has been loaded into the standard firmware storage area 301. Specifically, in a case where an error has been detected by the standard firmware updating program 510 while new firmware was loaded into the standard firmware storage area 301, the CPU 210 determines that the standard firmware storage area 301 has not been normally updated (NO in the step S715), and the process proceeds to step S716. On the other hand, when the error was not detected, the CPU 210 determines that the standard firmware storage area 301 has been normally updated (YES in the step S715), and the process proceeds to step S717.

In the step S716, the CPU 210 loads the backup of the older version of the standard firmware into the standard firmware storage area 301 again, and then the process proceeds to the step S717. This process prevents the information processing apparatus 10 from falling into a state in which it cannot be normally started when firmware update has failed.

In the step S717, the CPU 210 unmounts the standard firmware storage area 301 and the shared work area 305.

Then, in step S718, according to the standard firmware 506 in the updated new standard firmware storage area 301, the CPU 210 normally starts the information processing apparatus 10 and ends the present process.

This completes the process in FIGS. 7A and 7B. It should be noted that although in the example described above, firmware is obtained from the external server 180 in the steps S701 and S703, new firmware may be obtained in another way. For example, new firmware may be obtained by storing firmware in a USB memory, the PC 170, or the like and connecting it to a target apparatus like an information processing apparatus.

At normal startup, a plurality of programs implementing functions of the information processing apparatus 10 operates, and a lot of memory is used. On the other hand, at startup for update, only a limited amount of memory is used because the information processing apparatus 10 carries out only a firmware updating process without receiving any jobs which are executed at normal startup.

Accordingly, the shared work area 305 used at both normal startup and update startup of the information processing apparatus 10 as in the embodiment is prepared inside the eMMC 219. During normal startup, a swap file is created in the shared work area 305, and swapping using this swap file is activated. As a result, swapping is used at normal startup so that the information processing apparatus 10 can achieve the same performance as before while operating. On the other hand, during update startup of the information processing apparatus 10, swapping is not used, and in a case where a swap file is present in the shared work area 305, the swap file is deleted. A space freed by the deletion, is used as a work area in an updating process, and a backup of firmware is stored in the space.

As described above, in the present embodiment, one shared work area is properly used for the two different purposes according to the startup modes, and whether or not to create and use a swap file is determined according to the startup modes. As a result, a space necessary for swapping can be allocated while capacities of the RAM 212, the eMMC 219, and so forth are reduced, and hence the information processing apparatus 10 can be used while achieving the same performance as before.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-176265 filed on Oct. 20, 2020 which is hereby incorporated by reference herein in its entirety.

What is claimed is:

1. An information processing apparatus comprising:
a storage device that includes a first area storing normal startup firmware for normally starting the information processing apparatus, a second area storing update startup firmware for starting the information apparatus for update, and a common area that is used in a state where the information processing apparatus is started using the normal startup firmware or the update startup firmware; and
at least one processor that executes instructions stored in the storage device to:
perform a first startup where the information processing apparatus is started using the normal update firmware;
perform a second startup where the information processing apparatus is started using the update startup firmware;
during the first startup, in response to the first startup:
create the swap file in the common area and activate swapping in a state where a swap file is not present in the common area; and
not delete the swap file and maintain the activation of swapping in a state where the swap file is present in the common area; and
during the second startup, in response to the second startup, in the state where the swap file is present in the common area, delete the swap file from the common area.

2. The information processing apparatus according to claim 1, wherein
the at least one processor executes instructions to:
update the normal startup firmware stored in the first area; and
in updating the normal startup firmware, store data necessary for update of the normal startup firmware into the common area.

3. The information processing apparatus according to claim 2, wherein the data necessary for update of the normal startup firmware is a backup of the normal startup firmware stored in the first area.

4. The information processing apparatus according to claim 3, wherein the at least one processor executes instructions to, in updating the normal startup firmware, load a new version of the normal startup firmware, which was downloaded to the common area from an external apparatus, in the first area after the backup is stored in the common area.

5. A control method for an information processing apparatus, comprising a storage device that includes a first area storing normal startup firmware for normally starting the information processing apparatus, a second area storing update startup firmware for starting the information apparatus for update, and a common area that is used in a state where the information processing apparatus is started using the normal startup firmware or the update startup firmware, the control method comprising:
performing a first startup where the information processing apparatus is started using the normal startup firmware;
performing a second startup where the information processing apparatus is started using the second update startup firmware;
during the first startup, in response to the first startup:
creating a swap file in the common area and activating swapping in a state where a swap file is not present in the common area; and
not deleting the swap file and maintain the activation of swapping in a state where the swap file is present in the common area; and
during the second startup, in response to the second startup, in the state where the swap file is present in the common area, deleting the swap file from the common area.

6. A non-transitory computer-readable storage medium storing a program executable by a computer to execute a control method for the information processing apparatus comprising a storage device that includes a first area storing normal startup firmware for normally starting the information processing apparatus, a second area storing update startup firmware for starting the information apparatus for update, and a common area that is used in a state where the information processing apparatus is started using the normal startup firmware or the update startup firmware, the control method comprising:
  performing a first startup where the information processing apparatus is started using the normal startup firmware;
  performing a second startup where the information processing apparatus is started using the update startup firmware;
  during the first startup, in response to the first startup:
    creating a swap file in the common area and activating swapping in a state where a swap file is not present in the common area; and
    not deleting the swap file and maintain the activation of swapping in a state where the swap file is present in the common area; and
  during the second startup, in response to the second startup, in the state where the swap file is present in the common area, deleting the swap file from the common area.

* * * * *